United States Patent
Lebedev

(10) Patent No.: US 10,190,903 B2
(45) Date of Patent: Jan. 29, 2019

(54) DIGITAL FISHING NET SCALE CONFIGURED FOR INTEGRATION INTO A HOTSPOT SYSTEM

(71) Applicant: Alexander Lebedev, Seattle, WA (US)

(72) Inventor: Alexander Lebedev, Seattle, WA (US)

( * ) Notice: Subject to any disclaimer, the term of this patent is extended or adjusted under 35 U.S.C. 154(b) by 128 days.

(21) Appl. No.: 15/616,040

(22) Filed: Jun. 7, 2017

(65) Prior Publication Data

US 2018/0356278 A1   Dec. 13, 2018

(51) Int. Cl.
| | |
|---|---|
| *G06F 19/00* | (2018.01) |
| *A01K 85/01* | (2006.01) |
| *A01K 93/00* | (2006.01) |
| *G01C 13/00* | (2006.01) |
| *G01G 17/00* | (2006.01) |
| *G01G 19/00* | (2006.01) |
| *G01S 19/14* | (2010.01) |

(52) U.S. Cl.
CPC ............ *G01G 19/00* (2013.01); *A01K 85/01* (2013.01); *A01K 93/00* (2013.01); *G01C 13/00* (2013.01); *G01G 17/00* (2013.01); *G01S 19/14* (2013.01)

(58) Field of Classification Search
CPC ........ A01K 85/00; A01K 93/00; A01K 97/00; A01K 97/20; G01S 19/14
USPC .......... 702/173, 150, 155, 182–185
See application file for complete search history.

(56) References Cited

U.S. PATENT DOCUMENTS

| | | | | |
|---|---|---|---|---|
| 2015/0317502 A1* | 11/2015 | Castaneda | ............... | G01S 19/14 340/5.1 |
| 2016/0278360 A1* | 9/2016 | Battah | .................. | A01K 97/125 |
| 2017/0347634 A1* | 12/2017 | Castaneda | .............. | A01K 93/02 |

* cited by examiner

*Primary Examiner* — Edward Raymond
(74) *Attorney, Agent, or Firm* — James M. Smedley LLC; James Michael Smedley, Esq.

(57) ABSTRACT

The present invention generally relates to digital fishing net scales to determine the weight of a catch in the fishing net and to automatically record the weight. The present invention also relates to a system and method of automatically determining and recording the weight of a catch and catch related data, and to a system and method of generating fishing hotspot information. In particular, the present invention relates to digital scales that are communicatively connected to a system comprising a data store for automatically storing the weight of each catch/fish, and optionally for automatically storing related data. Related data may include catch related data originating from the digital fishing net scale or hotspot related data originating from devices/data stores operably connected to the hotspot system; illustrative examples include location, time, date, lunar phase, air temperature, water temperature, water depth, water salinity, weather conditions, species of fish, fish activity, and/or comments of a user. Further the present invention provides a system for generating fishing hotspot information that includes a digital fishing net scale, and methods that generate fishing hotspot information by determining and correlating weight data, optional catch related data, and hotspot related data with their corresponding location data.

19 Claims, 5 Drawing Sheets

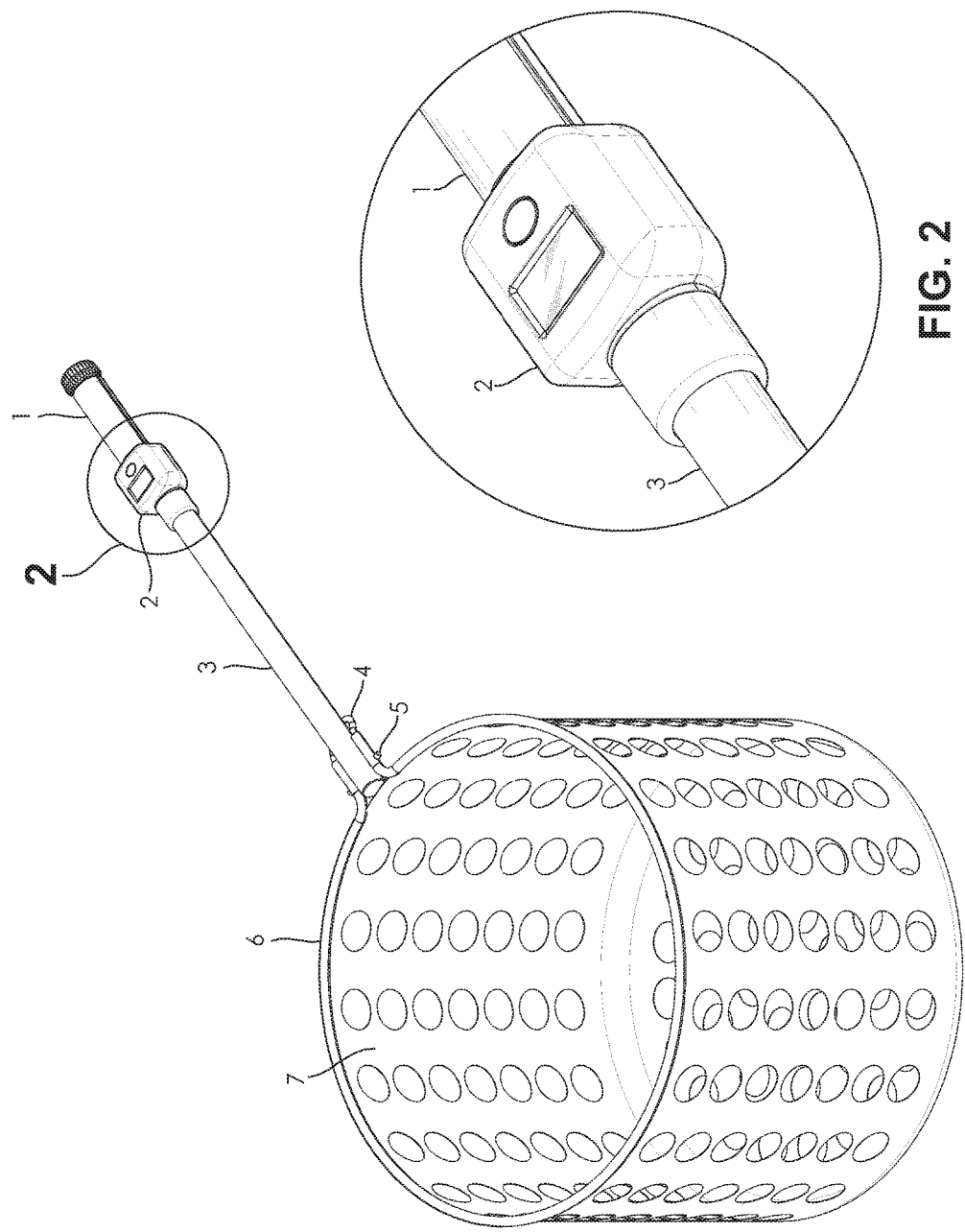

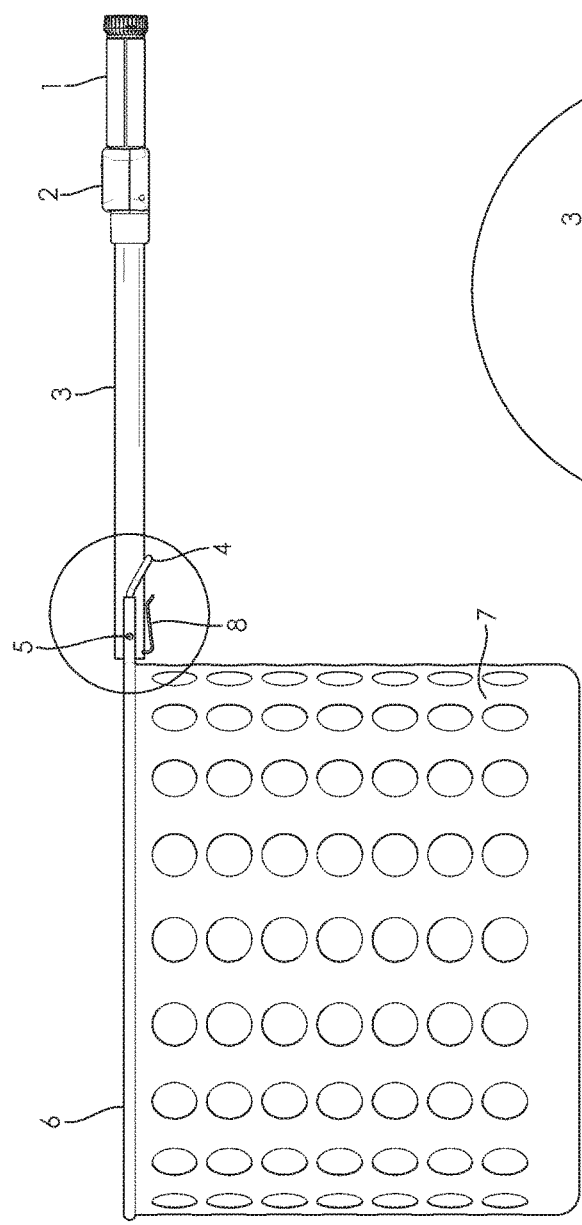
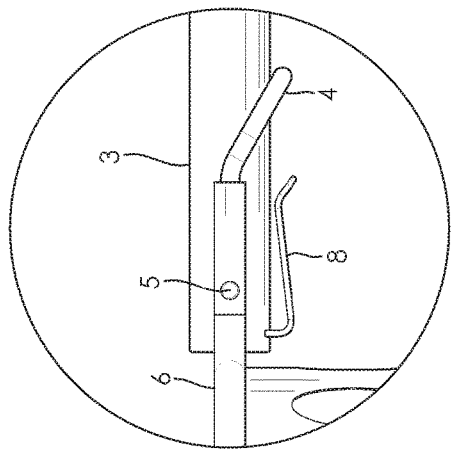
FIG. 5
FIG. 6

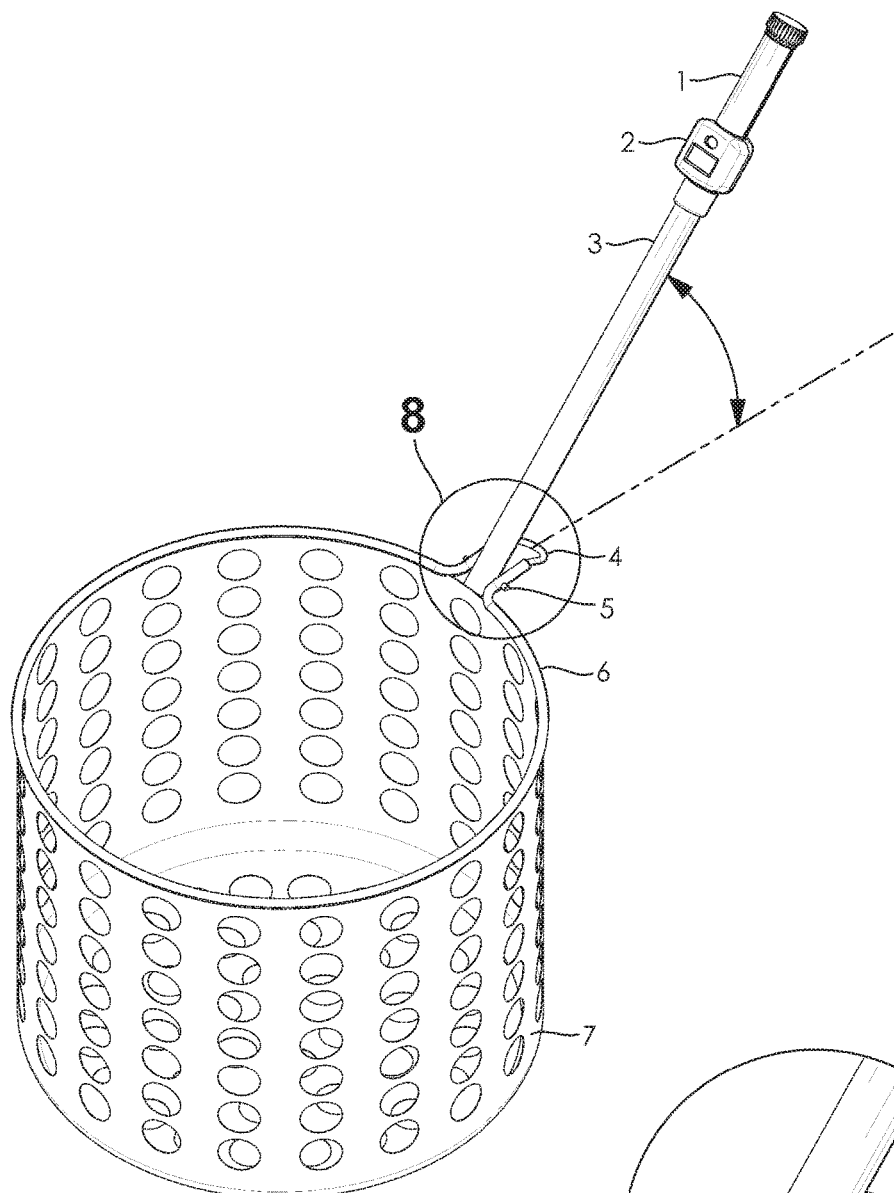
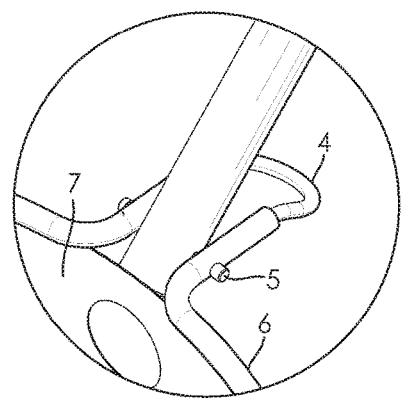
FIG. 7
FIG. 8

DIGITAL FISHING NET SCALE CONFIGURED FOR INTEGRATION INTO A HOTSPOT SYSTEM

FIELD OF THE INVENTION

The present invention generally relates to digital fishing net scales to determine the weight of a catch in the fishing net and to automatically record the weight. The present invention also relates to a system and method of automatically determining and recording the weight of a catch and catch related data, and to a system and method of generating fishing hotspot information. In particular, the present invention relates to digital scales that are communicatively connected to a system comprising a data store for automatically recording the weight of each catch/fish, and optionally for automatically storing related data. Related data may include catch related data originating from the digital fishing net scale or hotspot related data originating from devices/data stores operably connected to the hotspot system; illustrative examples include location, time, date, lunar phase, air temperature, water temperature, water depth, water salinity, weather conditions, species of fish, fish activity, number of fish caught, and/or comments of a user. Further the present invention provides a system for generating fishing hotspot information that includes a digital fishing net scale, and methods that generate fishing hotspot information by determining and correlating weight data, optional catch related data, and hotspot related data with their corresponding location data.

BACKGROUND OF THE INVENTION

Fishing net scales having a spring scale attached to the hoop and/or handle of a fishing net are known. However, a reading of the scale to determine the weight of a catch requires the scale to be held in a particular position which may be awkward for the user. Furthermore, readings may be inconsistent and incorrect if the catch or the user holding the scale is moving. This problem may be exacerbated by suboptimal visual conditions due to poor lighting and/or weather, e.g. early or late in the day, when it is raining, or at night. Typically, even at best conditions, several operational steps are needed to determine and record the weight of a catch, thus requiring time and effort.

Therefore, there is a need in the art for an improved fishing net scale that is more comfortable to use, requires less effort and time to weigh a catch or fish, and provides consistently correct readings regardless of conditions such as movement of catch or user, lighting and weather. Also, there is a need for a system and method to generate fishing hotspot information that includes processed weight data and that utilizes a digital fishing net scale integrated into the system.

SUMMARY OF THE INVENTION

Accordingly, embodiments of the present invention are directed to a digital fishing net scale and a method for weighing a catch and automatically recording the weight. In particular, embodiments of the present invention are directed to a fishing net scale that comprises a communication component to communicate weight data and optionally other catch related data to a data store of a hotspot system accessible to the user. Also provided is a system and method that utilizes a digital fishing net scale as an integrated part of the system for generating fishing hotspot information from weight data, one or more of catch related data and/or hotspot related data. These and other features and advantages of the present invention will be explained and will become apparent to one skilled in the art through the summary of the invention that follows.

Provided is a digital fishing net scale for weighing a fish contained in the net, the scale comprising a hoop, a fishing net configured to contain a fish and connected to the hoop, a handle connected to the hoop and configured for holding the net during fishing and weighing, and a digital scale connected to the handle; wherein hoop, handle and their connection are configured with sufficient strength and rigidity for holding the net weighted by a fish; wherein the scale is a digital scale that is comprised in a housing connected to the handle; wherein the digital scale comprises computer executable code stored in non-volatile memory, a processor, a memory, a measuring component, a weighing module, a display, a storage component for data, and a communication component; wherein the digital scale components are operably connected and are configured to perform the following steps: measure the weight of a fish contained in the net over an amount of time; provide one or more number value in a unit corresponding to the one or more weight measurement, or to an average thereof; show the number value and its unit on the display; store the number value and its unit, and optional catch related data, at least until it is uploaded; and upload the number value, and optional catch related data, via the communication component to an external data store.

Provided is a digital fishing net scale as described herein, wherein the hoop and the handle are connected with a connecting pin configured to allow folding the handle by pivoting its distal end towards the hoop, and the connecting pin and its connection are configured with sufficient strength and rigidity for holding the net weighted by a fish.

Provided is a digital fishing net scale as described herein, wherein the digital scale components are configured to perform the following further steps: determine one or more outlier in a plurality of number values; remove the one or more outlier; calculate an average value from the remaining number values; and show the average value on the display.

Provided is a digital fishing net scale as described herein, wherein the digital scale components to determine catch related data further comprise one or more of a global positioning system (GPS), a time piece, a thermometer, a conductivity sensor, an image sensor or camera optionally operably connected to an object detection module, a microphone operably connected to a voice recognition module, a weather module; and wherein the digital scale components are configured to perform the following further steps: determine catch related data that is related to the number value determined for the weight of a fish; store the catch related data at least until it is uploaded; and upload the catch related data via the communication component to an external data store; wherein the catch related data comprises one or more of location, time, date, lunar phase, water temperature, air temperature, water salinity, species of the weighed fish, comments of a user, and weather conditions.

Provided is a digital fishing net scale as described herein, wherein the digital scale components further comprise a GPS, and the catch related data comprises the location.

Provided is a digital fishing net scale as described herein, wherein the digital scale components further comprise a time piece, and the catch related data comprises one or more of the time, the date and the lunar phase.

Provided is a digital fishing net scale as described herein, wherein the digital scale components further comprise an image sensor and an object detection module, and wherein the digital scale components are configured to determine whether a fish is present in the net before storing or uploading the number value.

Provided is a digital fishing net scale as described herein, wherein the digital scale components further comprise a microphone and a voice recognition module, and the catch related data comprises the species of the weighed fish.

Provided is a digital fishing net scale as described herein, wherein the digital scale components further comprise an image sensor and an object detection module, and the catch related data comprises the species of the weighed fish.

Provided is a digital fishing net scale as described herein, wherein the digital scale components further comprise a display module configured to perform the following further steps: determine one or more of the time of day and weather conditions; and adjust one or more of brightness, contrast, gamma and color of the display.

Provided is a digital fishing net scale as described herein, wherein the display module is configured to adjust the display by automatically selecting from a plurality of pre-configured settings for lighting conditions including one or more of bright day, overcast day, dawn, dusk, or night.

Provided is a digital fishing net scale as described herein, wherein the display module is communicatively connected with one or more further digital scale component or module selected from time piece, weather module, camera, and image sensor.

Provided is a computer-implemented method for determining the weight of a fish caught in a digital fishing net scale, wherein the digital fishing net scale comprises a hoop, a fishing net configured to contain a fish and connected to the hoop, a handle connected to the hoop and configured for holding the net during fishing and weighing, and a digital scale connected to the handle; wherein hoop, handle and their connection are configured with sufficient strength and rigidity for holding the net weighted by a fish; wherein the scale is a digital scale that is comprised in a housing connected to the handle; wherein the digital scale comprises computer executable code stored in non-volatile memory, a processor, a memory, a measuring component, a weighing module, a display, a storage component for data, and a communication component, and wherein the digital scale components are operably connected and are configured to perform the steps of the method; and wherein the method comprises the steps of: automatically measuring a number value corresponding to the weight of a fish contained in the net over an amount of time thus providing one or more weight measurement; automatically providing one or more number value in a unit corresponding to the one or more weight measurement or to an average thereof; automatically showing the number value and its unit on the display; automatically storing the number value and its unit at least until it is uploaded; and automatically uploading the number value via the communication component to an external data store.

Provided is a computer-implemented method as described herein, wherein the method steps further comprise the steps of: automatically determining one or more outlier in a plurality of number values; automatically removing the one or more outlier; automatically calculating an average weight from the remaining number values; and automatically showing a number value corresponding to the calculated average weight on the display.

Provided is a computer-implemented method as described herein, wherein the method steps further comprise the steps of: automatically determining catch related data that is related to the numerical value determined for the weight of a fish; automatically storing the catch related data at least until it is uploaded; and automatically uploading the related catch data via the communication component to an external data store; wherein the catch related data comprises one or more of location, time, date, lunar phase, water temperature, air temperature, water salinity, species of the weighed fish, comments of a user, and weather conditions.

Provided is a computer-implemented method as described herein, wherein the method steps further comprise the step of: determining, by one or more digital scale component and a display module operably connected to the one or more digital scale component, one or more of the time of day and weather conditions; and adjusting one or more of brightness, contrast, gamma and color of the display.

Provided is a computer-implemented method as described herein, wherein adjusting one or more of brightness, contrast and color of the display is performed by automatically selecting from a plurality of pre-configured settings for lighting conditions including one or more of bright day, overcast day, dawn, dusk, or night.

Provided is a computer-implemented method for generating fishing hotspot information based on a plurality of data sources; wherein the data comprises weight and location, and optionally comprises one or more of time, date, lunar phase, air temperature, water temperature, water depth, fish activity, number of fish caught, water salinity, weather conditions, species of fish, and comments of a user; wherein the data is determined at the time when the weight of a catch is determined by the digital scale; wherein the method comprises the steps of: receiving, at a remote computing system, weight data of a catch; receiving, at said remote computing system, location data for the caught fish; and correlating, through the remote computing system, the data for a plurality of catches to generate fishing hotspot information.

Provided is a system for providing fishing hotspot information based on a plurality of data sources; wherein the data sources comprise weight and location, and optionally comprises one or more of location, time, date, lunar phase, air temperature, water temperature, water depth, fish activity, number of fish caught, water salinity, weather conditions, species of fish, and comments of a user; wherein the system comprises computer executable code stored in non-volatile memory, a processor, a memory, a display, a storage component for data, a digital fishing net scale, and a communication component; wherein the system comprises one or more of a time piece, a thermometer, a sonar, a conductivity sensor, a weather module, an image sensor, a camera, a microphone, a data store data source; and wherein the system components are operably connected and are configured to perform the following steps: receiving, at a remote computing system, weight data and location data of a catch; correlating, through the remote computing system, the data of a plurality of catches, to generate fishing hotspot information.

The foregoing summary of the present invention with the preferred embodiments should not be construed to limit the scope of the invention. It will be apparent to one of ordinary skill in the art that the embodiments of the invention thus described may be further modified without departing from the spirit and scope of the invention.

BRIEF DESCRIPTION OF THE DRAWINGS

FIG. 1 illustrates a perspective view of a digital fishing net scale with its handle extended;

FIG. 2 illustrates a perspective view of a digital scale connected to the handle of the fishing net;

FIG. 5 illustrates an orthogonal side view of a digital fishing net scale with its handle extended; and FIG. 6 illustrates an orthogonal side view of the connection of the hoop to the handle of the fishing net;

FIG. 7 illustrates a perspective view of a digital fishing net scale with its handle partially folded; and FIG. 8 illustrates a perspective detail view of the connection of the hoop to the handle of the fishing net;

DETAILED DESCRIPTION OF THE INVENTION

Figures 3, 4:
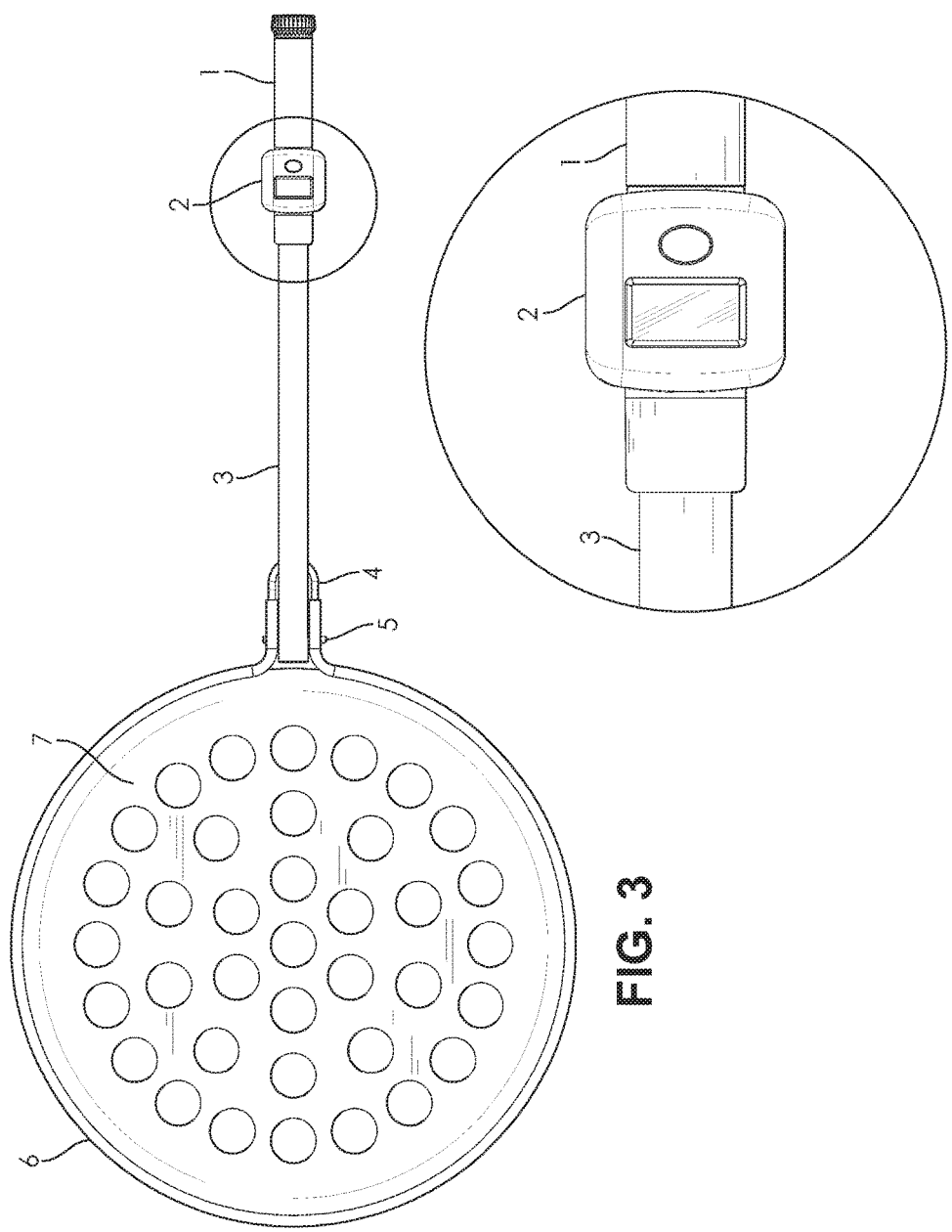
FIG. 3 illustrates an orthogonal top view of a digital fishing net scale with its handle extended.
FIG. 4 illustrates an orthogonal top view of a digital scale connected to the handle of the fishing net.

The present invention generally relates to digital fishing net scales to determine the weight of a catch in the fishing net and to automatically record the weight. The present invention also relates to a system and method of automatically determining and storing the weight of a catch and catch related data, and to a system and method of generating fishing hotspot information. In particular, the present invention relates to digital scales that are communicatively connected to a system comprising a data store for automatically storing the weight of each catch/fish, and optionally for automatically storing related data. Related data may include catch related data originating from the digital fishing net scale or hotspot related data originating from devices/data stores operably connected to the hotspot system; illustrative examples include location, time, date, lunar phase, air temperature, water temperature, water depth, water salinity, weather conditions, species of fish, fish activity, and/or comments of a user. Further the present invention provides a system for generating fishing hotspot information that includes a digital fishing net scale, and methods that generate fishing hotspot information by determining and correlating weight data, optional catch related data, and hotspot related data with their corresponding location data.

According to an embodiment of the present invention, the digital fishing net scale may comprise a handle connected to a hoop, and a mesh net connected to the hoop that is configured to hold a fish contained in the net. The fishing net may be configured as a hand net or a landing net, and depending on the target species, the dimensions of hoop, net and handle may be chosen accordingly. For example, the length of the handle may be sufficiently long to allow scooping up the fish from e.g. the side of a boat, bank of a river or a pier, and the hoop may be sufficiently wide to allow for the size range of the target fish species. A hand net typically is configured for sweeping up fish near the water surface, and when used by an angler to help land a fish it is known as a landing net. A hand net typically is larger and has a longer handle, while landing nets are typically smaller. The handle may be connected to the hoop at one distal end, and may be configured with a grip made from a non-slip material at the opposite distal end. A particular example of a fishing net with fully foldable handle is shown in the figures. However, embodiments of the invention are envisioned with many different styles and shapes of fishing nets having hoops and handles chosen in various styles and dimensions, as will be apparent to a person of ordinary skill in the art.

According to an embodiment of the present invention, the handle of the digital fishing net scale may comprise a ruler or measuring scale to measure the length of a fish. The ruler may indicate one or more units of length, including, for example, inches and centimeter, or preferably both (for example the top may show inches, and the bottom may show centimeters). The zero point of the ruler may preferably be located near the hoop end of the handle. Alternatively, the zero point may be located near the hand grip. To measure a fish, the handle may be used in extended position, or alternatively may be folded up towards the loop, depending on which side of the handle the ruler is located. Preferably the ruler is located on the side of the handle facing the user when the handle is extended; a fish inside the net may be measured by pulling the bottom of the net towards the handle to align the fish with the ruler above it. Alternatively the ruler may be located on the opposite side of the handle, for measuring a fish inside the net when the handle is folded up over the loop.

In embodiments of the invention, the mesh of the net may generally be made from fibers woven in a grid-like structure, e.g. a mesh formed by knotting a relatively thin thread, or a fabric with holes of suitable size to contain fish while letting water escape. The net may be selected depending on the targeted species and will differ in the specifications of mesh grid size, material and its weight, strength, its weight/strength ratio, whether it comprises knots, and the mesh bag depth, as will be apparent to a person of ordinary skill in the art. For example, for river/stream fishing and in particular trout, a knotless mesh, e.g. as shown in the figures, may be used. The lack of knots may protect fish scales and gills of the smaller and more delicate fish species. The mesh grid size may differ depending on the species targeted, and a mesh of any suitable size may be used, as will be apparent to a person of ordinary skill in the art. The mesh bag depth may be selected depending on the size/length of the targeted fish and to avoid excessive material for fish and lures to get tangled in, as will be apparent to a person of ordinary skill in the art. The net shown in the figures is one particular example of a net, and embodiments of the invention are envisioned with any style and size of mesh, any mesh bag depth, and any type of net materials woven into any suitable structure, as will be apparent to a person of ordinary skill in the art.

In embodiments of the invention, the net may be typically made of a synthetic material, though naturally derived materials could also be used. Examples may include polyamides (PA, nylon), coated nylon, or rubber (especially for catch-and-release due to its softness on fish scales, and gills). Other synthetic fibers that may be used include polyester (PES), polyethylene (PET), polypropylene (PP), aramid, and high-density polyethylene (HDPE). The material may be selected depending on desired characteristics such as strength, handling, buoyancy, durability, UV resistance, etc., as will be apparent to a person of ordinary skill in the art.

The hoop and the handle each may be made from any sufficiently strong and rigid material, depending on the desired strength, flexibility, durability and weight of the fishing net. For example, the hoop and handle may be made from one or more of wood, wicker, metal, plastic, carbon fiber, or combinations thereof. The hoop may be, for example, a metal hoop, and the handle may be wood or plastic or a combination thereof. The material used for hoop or handle may be solid or hollow. The materials suitable for the hoop and handle will depend on the range of size and weight of the fish species targeted and on the length of the hoop and handle, as will be apparent to a person of ordinary skill in the art.

Optionally, a hook may be attached to the distal hoop end of the handle, for hanging the net when folded (e.g. from the user's belt, or on a wall). The hook similarly may be made of a sufficiently strong and/or flexible material, e.g. metal or plastic. Suitable alternative materials will be apparent to a person of ordinary skill in the art.

In embodiments of the invention, the hoop may be substantially round with a loop extending outwards for attachment to the handle, e.g. by a connecting pin, as shown in FIGS. 5-9. The loop stabilizes the handle in horizontal position when fully extended, see FIGS. 6-7. Depending on the targeted fish species and fishing style, other shapes may be used, for example, the hoop may be substantially oval, tear-shaped or a rounded triangular shape. Generally the total width and/or width at the top of the hoop may be chosen adequate in size to accommodate the dimensions of the targeted fish species. For example, round nets may have a diameter of about 10 in to about 30 in, for example about 20 in (or about 500 mm). Depending on the size of the target fish species the hoop may be at least about 30 in, at least about 20 in, or at least about 10 in. Oval or tear-shaped nets may be, for example, about 32 by about 41 inches, about 20 by about 23 in, and about 11 by about 15 in. The hoop dimensions will depend on the range of size of the fish species targeted, and dimensions may be selected accordingly, as will be apparent to a person of ordinary skill in the art.

In embodiments of the invention, the handle may be configured with a hand grip for holding the handle. The grip may be made from a synthetic or natural non-slip material, e.g. rubber, silicone, leather, cork, wood, etc. For example, a rubber or silicone-coating or leather wrap onto a metal handle may be used. Materials like wood or cork may be fastened by a suitable fastener including screws, rivets, adhesives and other fastening means. Optionally, in particular in case of solid materials, the surface of the material may additionally be provided with grooves, etchings or carvings to provide a non-slip surface. Optionally, the grip may be configured in an ergonomic shape to better fit the human hand. The hand grip in embodiments of the invention may be configured having many different shapes and various surface materials may be chosen, as will be apparent to a person of ordinary skill in the art.

In embodiments of the invention, a connecting pin may be used to connect, and in particular, to pivotably connect, the hoop to the handle. The connecting pin thus may preferably at the same time serve as a pivot joint to allow the handle to be fully folded for storage, see FIG. 9. The connecting pin may be made of any substantially rigid material of sufficient strength and elasticity, for example metal, hardwood, hard plastic, carbon fiber, and preferably a corrosion-resistant metal such as steel, as will be apparent to a person of ordinary skill in the art. Alternatively a connection of the hoop and handle may be achieved by a one-piece construction, a press-fit connection, or by a suitably strong fastener, including, e.g., screws, rivets, and/or adhesives, as will be apparent to a person of ordinary skill in the art.

According to an embodiment of the invention, a digital scale may be integrated into the handle of the fishing net for determining the weight of a fish once caught. Preferably, the digital scale components may be present in a housing operably connected to the handle at a distal end of the handle opposite the loop and near the hand grip. Preferably the housing may be watertight, or at least sufficiently waterproof for rain, splash water and near-surface immersions. The digital scale components may be operably connected to each other and may include and be connected to a measuring component which may be operably connected to the handle. As will be apparent to a person of ordinary skill in the art, various types of digital scales and measuring components may be used in embodiments of the invention. Generally, in the measuring component of a digital scale, electronic circuits are used to convert a physical measurement, in particular, weight, into a digital signal, and show the weight in a number value of an appropriate unit, for example lbs (pounds), or kg (kilograms), on a display.

In embodiments of the invention, the measuring component may be, for example, a load cell which is used to convert a force into an electrical signal. Through a mechanical arrangement, the force being sensed typically deforms a part of the measuring component, for example a strain gauge. The strain gauge converts the deformation/strain to electrical signals. The software and electronics of the device may convert the voltage of the load cell into a force value and/or equivalent weight value that may be shown on the display of the digital scale.

In embodiments of the invention, the components of a digital scale may comprise computer executable code stored in non-volatile memory, and operably connected digital scale components such as a processor, a memory, a measuring component, a weighing module, a display, a storage component for data, and a communication component. The digital scale may further comprise one or more of a microphone operably connected to a voice recognition module, an image sensor or camera operably connected to an object detection module, a thermometer operably connected to temperature module, a temperature module operably connected to a thermometer, a conductivity sensor operably connected to a salinity module, a salinity module communicatively connected to a conductivity sensor, a display module to automatically adjust the display, and a weather module communicatively connected to the hotspot system or an external database. The digital scale components may be configured to determine the weight of a fish contained in the net, show a number value corresponding to the determined weight on the display, store the number value at least until it is uploaded, and upload the number value via the communication component to an external data store. Optionally, catch related data may be determined and stored in the digital scale at least until it is uploaded/communicated to an external data store.

In embodiments of the invention, the digital scale comprises a weighing module for a consistent determination of the weight of a catch. The weighing module is communicatively connected to the components of the digital scale, including the measuring component, and the display, and determines a number value for the weight, shows the number value on the display, and stores it. For example, the weight may be determined by a single measurement. Preferably, the weight may be determined by a plurality of measurements that may be averaged, optionally after removal of outliers. Multiple measurements may be shown on the display as they are taken. Alternatively, only the average may be shown once determined.

In embodiments of the invention, the weighing module may be configured to initiate and process a plurality of measurements to determine an average. For example, 1, 2, 3 or 4 measurements per second over a particular amount of time may be taken, for example for a duration of up to one or more seconds, e.g. up to 1, 2, 3, 4, 5 or 6 seconds. The weighing module may be configured to make a determination whether or not there is a change in the determined weight during the amount of time that is measured. If the determined weight is constant (no change), then the determined weight may be stored. If the multiple measurements differ but are within an acceptable pre-determined error margin, the weighing module may be configured to determine an average weight (median or mean) from the multiple measurements and store the determined number value for the average. If the determined measurements differ substantially (e.g. more than a pre-determined margin), the digital scale may provide a corresponding message to the user, e.g. "inconsistent reading", "new measurement necessary", "please measure again", or similar, to indicate that another measurement has to be taken.

In embodiments of the present invention, alternatively or additionally, the weighing module may be configured to determine and remove one or more outlier measurement from the measurements used to determine an average weight. For example, one or more statistical method may be used to determine and remove outliers, as will be apparent to a person of ordinary skill in the art. For example, in an embodiment of the present invention, the weighing module may be configured to identify and remove outliers as follows. Outliers may be defined as any values that fall outside of Q1−(1.5×IQR), or outside of Q3+(1.5×IQR), with Q1 being the 1st quartile (25% of the data are less than or equal to this value), Q3 being the 3rd quartile (25% of the data are greater than or equal to this value), and IQR being the interquartile range, i.e. Q3−Q1 (the distance between Q1 and Q3 which contains the middle 50% of the data). Other useful statistical methods to determine and remove outliers may include model-based methods that assume a normal distribution and identify measurements deemed "unlikely" based on mean and standard deviation, for example: Chauvenet's criterion, Grubbs' test for outliers, Dixon's Q test, ASTM E178 Standard Practice for Dealing With Outlying Observations, Mahalanobis distance and leverage. Once a weight is successfully determined, the corresponding numerical value may be stored, and upon connection uploaded to a computer system, optionally together with catch related data.

In embodiments of the invention, catch related data may be determined, stored and uploaded to an external computer system, and in particular to the hotspot system described herein below, and may be integrated with hotspot related data to generate hotspot information by the hotspot system described herein below. Catch and hotspot related data may include one or more of location, time, date, lunar phase, water temperature, water depth, water salinity, air temperature, weather conditions, species of fish, number of fish caught, sonar data such as fish activity, and/or comments of a user determined at the time when the weight of a catch is determined by the digital scale. The digital fishing net scale may thus comprise one or more additional on-board components to determine the catch related data, and/or may comprise one or more additional on-board modules that are communicatively connected to one or more additional external data-providing components or devices, in particular devices operably connected to the hotspot system described herein below, that may determine catch related and/or hotspot related data (e.g. a sonar device such as the iBobber™ described herein below), and generate hotspot information.

Such additional components or modules of the digital fishing net scale may include a time piece to determine the time a catch was weighed, a global positioning system (GPS) to determine a location corresponding to each weight determination, a temperature sensor to determine the air temperature and/or the water temperature, a weather module to determine weather conditions for the time and location of the catch, a microphone operably connected to a voice recognition module for voice entry of catch related data, and an image sensor or camera operably connected to an object detection module to determine whether a fish is present in the net before initiating a weight measurement, and optionally to determine a species corresponding to each weight determination. The microphone may allow hand-free entry of catch related data by the user, for example including voice commands, the fish species, and user comments, e.g. as to particular conditions or events that accompanied the catch (for example: "enter fish species: trout", "enter comment: water level is at the high water mark").

In embodiments of the invention, the digital scale may comprise a time piece which may be used to determine a time, date and lunar phase corresponding to each weight determination. The time piece may be electronic, may be a module of the digital scale or of the hotspot system, and may be configured to automatically determine and/or adjust the time using external resources via the communication component. Time pieces and their components are well known in the art and it will be apparent to a person of ordinary skill in the art how to integrate a time piece into the digital scale or hotspot system.

In embodiments of the invention, the digital scale may comprise a global positioning system (GPS) to determine a location corresponding to each weight determination. The GPS may be a module of the digital scale and may use external resources to determine the location, e.g. via the communication component of the digital scale. GPS devices and components are well known in the art and the integration of a GPS component into the digital scale will be apparent to a person of ordinary skill in the art.

In embodiments of the invention, the digital fishing net scale or the hotspot system may comprise a temperature sensor to determine the water and/or air temperature. The temperature sensor may be an on-board component of the digital fishing net scale, for example, the sensor may be configured in a part of the loop that is exposed to/submerged in the water, e.g. at the top of the hoop end of the digital fishing net scale, furthest from the hand grip, where the water surface can be most easily reached. Alternatively, the digital fishing net scale or the hotspot system may be configured with a temperature module communicatively connected to and exchanging data with (e.g. via the communication component) an external temperature sensor, for example located in one or more fishing device, such as a sonar device. A preferred sonar device is the iBobber™ (a sonar with wireless connectivity, publicly available from Reelsonar, Seattle, Wash. and described in U.S. Pat. Nos. 8,934,318 and 9,360,553, the disclosures of which are incorporated herein by reference in their entirety).

In embodiments of the invention, the digital fishing net scale or the hotspot system may comprise a conductivity sensor. The conductivity sensor may be an on-board sensor of the digital fishing net scale, for example, the sensor may be configured in a part of the loop that is exposed to/submerged in the water, e.g. at the top of the hoop end of the digital fishing net scale, furthest from the hand grip, where the water surface can be most easily reached. Alternatively, digital scale may comprise a salinity module communicatively connected to a conductivity sensor, and the conductivity sensor may be part of the hotspot system. For example, the conductivity sensor may be part of a sonar device, for example of the iBobber™ (a sonar with wireless connectivity, publicly available from Reelsonar, Seattle, Wash. and described in U.S. Pat. Nos. 8,934,318 and 9,360,553, the disclosures of which are incorporated herein by reference in their entirety). The conductivity sensor may sense the salinity of the water into which the sensor-carrying part of the digital fishing net scale or the sonar device is submersed. Conductivity sensors are known in the art and it will be apparent to a person of ordinary skill how to integrate a sensor into a device or system.

In embodiments of the invention, the digital scale may comprise an image sensor/camera and an object detection module, each operably connected to the object detection module and to the remaining digital scale components. The object detection module may use external resources to determine the location via the communication component. Image sensors/cameras and object detection modules are well known in the art and the integration of an image sensor/camera and object detection module will be apparent to a person of ordinary skill in the art.

In embodiments of the present invention, the digital scale may comprise a communications component to communicate data including voice or video communications over one or more networks or to one or more peripheral devices or systems such as the hotspot system and its devices. A preferred communication component is a Bluetooth® connection, e.g. for communicating with the cell phone of a user. Other appropriate communications components may include, but are not limited to, wireless connections, wired connections, cellular connections, data port connections, or any combination thereof. Communication components such as the above are well known in the art and it will be apparent to a person of ordinary skill in the art how to integrate a communication component such as e.g. a Bluetooth® chip with radio and software into the digital scale.

In embodiments of the present invention, the digital scale may be configured with a graphical user display (GUI) configured to be shown on a display, for example on a LED display or touchscreen display. The GUI may be configured with a menu and options that can be chosen by the user through one or more button (including e.g. a 4-directional "joystick" style button to move up/down/left/right), or through symbols shown on the touchscreen. GUIs are well known in the art and integration of a GUI into the digital scale will be apparent to a person of ordinary skill in the art.

In embodiments of the invention, the GUI may include options to change the unit of weight shown on the display (e.g. lb or kg), a tare feature (e.g. to account for a wet net, or to re-calibrate after exchange of the net for a new one, or after changes in conditions that may affect a reading such as temperature), communication options (including e.g. Bluetooth options for pairing/bonding and/or data upload options), and display options.

In embodiments of the invention, the GUI may include one or more shortcut buttons/symbols on the home screen comprising one or more button/symbol for activation of Bluetooth, and uploading new data. Alternatively, the digital scale may be configured to automatically attempt to upload new data each time a new data set relating to a weight determination is added. Still alternatively, the digital scale may be configured with settings that may be automatic or that may be chosen by the user via a settings menu in the GUI. The settings menu may include choices for upload options including automatic upload, conditions for automatic upload attempts, menu options for uploads, and a shortcut upload button. The conditions for automatic upload attempts may include whether or not the digital scale is within range of a paired device, a minimum or maximum number of tries to connect, and/or time intervals for subsequent attempts to connect.

In embodiments of the invention, display options of the GUI may include user choices to adapt the display of the digital scale to different lighting conditions. In particular, the GUI may include options to use particular pre-determined profiles (day, sunny day, cloudy day, dusk/dawn, night), and options to directly adjust parameters (e.g. increasing or decreasing one or more of brightness, contrast, gamma, color temperature). The pre-determined profiles may include display parameter combinations, for example, an intermediate profile with display parameters adapted for viewing in typical conditions, a sunny day profile with moderately or strongly increased brightness and contrast, and a dusk/dawn or night profile with a moderately or strongly decreased brightness and contrast, and/or change of hue, e.g. to green for better low light visibility.

In embodiments of the invention, alternatively or additionally to the display options of the GUI, the digital scale may comprise a display module for automatic adjustment of the display. The display module may be operably connected to the digital scale components including the display and additional components, and configured to automatically determine one or more of the time of day (e.g. via an internal or external time piece), the location (e.g. via a GPS), location-dependent times for sunrise and sunset and/or the most recent weather conditions (e.g. via a database stored in the digital scale, determined/downloaded from a database of the computer system, the hotspot system as described herein below, or determined/downloaded from an external/3$^{rd}$ party database or weather app). Depending on the one or more determination, the display module may be configured to automatically adjust one or more display parameter such as brightness, contrast, gamma, color temperature, and color hue of the display, e.g. to a plurality of pre-determined profiles as detailed herein above.

In embodiments of the invention, the one or more digital scale component operably connected to the display module may comprise an image sensor or camera which may be configured to automatically detect lighting conditions, and the display module may be configured to automatically adjust the display in parameters including e.g. brightness, contrast, color hue, gamma etc. The GUI may include a menu of user selectable pre-determined display choices including one or more display parameters, and may optionally include options to save one or more user display profile, and options to switch between pre-determined and user-created profiles.

In embodiments of the invention, the GUI via the display may automatically show system messages and user interaction options, for example the remaining power when power is low (or upon user request), selectable options to save power (e.g. reduced display brightness of the display, reduced communication options, delayed upload), or a power down message before automatic shut down due to low battery. Remaining power may be indicated e.g. as an estimate of remaining hours/minutes of operation, a "batteries low" notification at a certain remaining amount or amounts (e.g. 30%, 20%, 10%, 5%) or remaining operation time estimate, etc.

In embodiments of the invention, a hotspot system may generate and provide fishing hotspot information based on a plurality of data sources, including sources of catch related and/or hotspot related data as described herein above. Preferably, a large number of data points from multiple data sources (in particular number of weighed catches or sonardetected fish activity and related data) will be processed and analyzed by the system to provide predictions about location, quantity and species of fish and fishing trends. For example, the number of catches or fish activity incidents processed to provide hotspot information may comprise at least 5, 10, 20, 30, 50, 100, or more data points. The system may comprise computer executable code stored in non-volatile memory, a processor, a memory, a display, a storage component for data, a digital fishing net scale, a communication component, and optionally a sonar device. The system components may be operably connected and configured to receive, at a remote computing system, weight data and location data for a catch, and to correlate, through the remote computing system, the weight data and the location data of a plurality of catches, to provide fishing hotspot information. Optionally one or more of location, time, date, lunar phase, air temperature, water temperature, water depth, fish activity, water salinity, weather conditions, species of fish, and comments of a user of a plurality of catches may be additionally determined and processed and/or correlated to generate the fishing hotspot information.

According to an embodiment of the present invention, the remote computing system of the hotspot system may employ a reasoning engine. In a preferred embodiment, the reasoning engine receives and analyzes various data points from one or more data source including, but not limited to, one or more data store, digital fishing net scale or a component or module thereof, sonar device or a component or module thereof, one or more remote computing device interfaces, and the internet to generate hotspot information.

According to an embodiment of the present invention, the remote computing system may include a remote computing device interface. In a preferred embodiment, the remote computing device interface may be an application programming interface ("API") or other interface capable of receiving information from and transmitting information to a remote computing device. One of ordinary skill in the art would appreciate that there are numerous types of remote computing device interfaces that might be utilized with embodiments of the present invention, and embodiments of the present invention are contemplated for use with any type of remote computing device interface.

According to an embodiment of the present invention, the reasoning engine may determine available points of fishing data in the one or more data sources. Fishing data points may include, but are not limited to location, time, date, lunar phase, determined number value for weight of catch/fish, number of fish caught, fish activity, air temperature, water temperature, water depth, water salinity, and weather conditions. The reasoning engine may then create an independent variable from each available point of fishing data. In a preferred embodiment, the reasoning engine may determine what points of fishing data are available from a variety of sources, including, but not limited to, the data store of the remote computing system, data collected in real-time by one or more of a digital fishing net scale (or any component/module thereof as described herein-above), a sonar device (or any component/module thereof as described herein-above), and the internet.

According to an embodiment of the present invention, the reasoning engine may generate an initial base model based upon the available fishing data points. Each available point of fishing data (or any subset thereof) may be assigned as an independent variable that may be used for generating hotspot information. The reasoning engine may generate hotspot information by comparing real-time fishing data points to those of the initial base model. As with the initial base model, the real-time fishing data points may be collected from multiple data sources, including but not limited to one or more of a digital fishing net scale (or any component/module thereof as described herein-above), a sonar device (or any component/module thereof as described herein-above), and the internet.

According to an embodiment of the present invention, the remote computing system may include one or more data stores configured to store data points and transmit data points to a reasoning engine or a remote computing device interface. In a preferred embodiment, the data store may be configured to log data related to hotspot information generated by the reasoning engine. One of ordinary skill in the art would appreciate that there are numerous types of data stores that might be utilized with the remote computing system, and embodiments of the present invention are contemplated for use with any type of data store.

According to an embodiment of the present invention, a method for providing hotspot information may identify predicted fishing trends for given locations by analyzing past and present values of various data points and by generating hotspot information based upon that analysis. Data points for use in providing hotspot information may include, but are not limited to, location, time, date, lunar phase, weight of fish caught, number of fish caught, fish activity, air temperature, water temperature, water depth, water salinity, and weather conditions. One of ordinary skill in the art would appreciate that there are numerous types of data points that could be utilized to generate hotspot information, and embodiments of the present invention are contemplated for use with any type of data points.

For example, the reasoning engine may create an independent variable for each of the available fishing data points. The available data points may be real time fishing data of the digital fishing net scale (or any component/module thereof), sonar device (or any component/module thereof), or historical fishing data logged a data store, in particular a data store of the hotspot system. The initial base model may be generated by the reasoning engine from the real time fishing data of one or more of a digital fishing net scale, a sonar device, and fishing data logged in the data store. The reasoning engine may generate an initial base model and compare the initial base model to real-time fishing data collected by one or more of a digital fishing net scale, a sonar device, and a data store. The reasoning engine may generate hotspot information based on the comparison of the initial base model and the real-time fishing data. Portions of the hotspot information may identify and predict fishing trends for fishing locations. The generated hotspot information may be logged in the data store for future reference and future analysis.

According to an embodiment of the present invention, the hotspot information may be logged in a data store for later use and retrieval by the hotspot system. In a preferred embodiment, the hotspot information may be saved in the data store for future use by the hotspot system where historical data may be used to validate or improve upon newly added or received information about one or more hotspots. One of ordinary skill in the art would appreciate that there are numerous methods for logging hotspot information in a data store and embodiments of the present invention are contemplated for use with any such method for logging hotspot information.

In embodiments of the invention, the digital scale may communicate and be used with, and/or upload data to, one or more computing devices or computer system such as the hotspot system. One of ordinary skill in the art would appreciate that a computing device appropriate for use with embodiments of the present application may generally be comprised of one or more of a Central processing Unit (CPU), Random Access Memory (RAM), a storage medium (e.g., hard disk drive, solid state drive, flash memory, cloud storage) and mother board, an operating system (OS), one or more application software, display element and one or more input/output devices/means. Examples of computing devices usable with embodiments of the present invention include, but are not limited to, smart phones, laptops, mobile computing devices, tablet PCs, personal computers, and servers. One of ordinary skill in the art would understand that any number of computing devices could be used, and embodiments of the present invention are contemplated for use with any computing device.

In embodiments of the invention, the digital scale may provide or transfer data to a computer system, store data in the system and/or provide data to users of the system across local area networks (LANs) (e.g., office networks, home networks) or wide area networks (WANs) (e.g., the Internet), e.g. the hotspot system. For example, the system may be comprised of numerous servers communicatively connected across one or more LANs and/or WANs. Computing devices including mobile computing devices such as smart phones or tablets may form part of the system, or may connect to or communicate with the system, e.g. by transmitting or receiving data such as weight data, location data, catch related data, hotspot related data, or any data useful for one of the digital scale's or the hotspot system's determinations. One of ordinary skill in the art would appreciate that there are numerous manners in which the digital scale could be configured to communicate and exchange data with a system, and that there are numerous manners the system could be configured for such communication and data exchange, and embodiments of the present invention are contemplated for use with any such configurations.

In general, the digital fishing net scale and methods provided herein may be employed by a user whether connected to a network or computing device or not. According to an embodiment of the present invention, some of the applications of the present invention may not be accessible when not connected to a network or a computing device, however a user may be able to create and/or store data offline that will be communicated/uploaded to the system when the user is later connected to a network or computing device.

A wide variety of computer network systems over numerous topologies may be communicated with by embodiments of the invention. The configuration and management of large networks may include storage devices and computers that are communicatively coupled to dissimilar computers and storage devices over a network, such as the Internet. A system for use with an embodiment of the present invention may be comprised of one or more application servers for electronically storing information uploaded into and used by the system. Applications in the server may retrieve and manipulate information in storage devices and exchange information through a WAN (e.g., the Internet). Applications in a server may also be used to manipulate information stored remotely and process and analyze data stored remotely across a WAN (e.g., the Internet).

In systems for use with embodiments of the present invention, exchange of information through the WAN or other network may occur through one or more high speed connections. In some cases, high speed connections may be over-the-air (OTA), passed through networked systems, directly connected to one or more WANs or directed through one or more optional routers. One of ordinary skill in the art would appreciate that there are numerous ways a server may connect to a WAN for the exchange of information, and embodiments of the present invention are contemplated for use with any method for connecting to networks for the purpose of exchanging information. Further, while this application refers to high speed connections, embodiments of the present invention may be utilized with connections of any speed.

Components of the digital scale may connect to a server via a WAN or other network in numerous ways. For instance, a component may connect to the system i) through a computing device directly connected to a WAN, ii) through one or more computing device connected to a WAN through a routing device, iii) through one or more computing device connected to a wireless access point or iv) through a computing device via a wireless connection (e.g., CDMA, GMS, 3G, 4G) to a WAN. One of ordinary skill in the art would appreciate that there are numerous ways that a component may connect to a server via a WAN or other network, and embodiments of the present invention are contemplated for use with any method for connecting to a server via a WAN or other network. Furthermore, a server could be comprised of a personal computing device, such as a smartphone, acting as a host for other computing devices to connect to.

The communications means of a system for use with embodiments of the present invention will communicate and exchange data with one or more of the digital scale's communication component, and may be, for instance, any means for communicating data, voice or video communications over one or more networks or to one or more peripheral devices attached to the system. Appropriate communications means may include, but are not limited to, wireless connections, wired connections, cellular connections, data port connections, Bluetooth® connections, or any combination thereof. One of ordinary skill in the art would appreciate that there are numerous communications means/components that may be utilized with embodiments of the present invention, and embodiments of the present invention are contemplated for use with any communications means/components.

In embodiments of the present invention, the digital scale components may comprise one or more computer programs. Similarly, the computing devices that the digital scale communicates or exchanges data with may comprise one or more computer programs. Traditionally, a computer program consists of a finite sequence of computational instructions or program instructions. It will be appreciated that a computing device can receive such a computer program and, by processing the computational instructions thereof, produce a further technical effect. Computer program instructions can be stored in a computer-readable memory capable of directing a computer or other programmable data processing apparatus to function in a particular manner.

A computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Computing devices and systems as described herein are not limited to applications involving conventional computer programs or programmable apparatuses that run them. It is contemplated, for example, that computing devices and systems could include embodiments could use, or be configured for use with, an optical computer, quantum computer, analog computer, or the like. Regardless of the type of computer program or computer involved, a computer program can be loaded onto a computer to produce a particular machine that can perform any and all of the described functions. This particular machine provides a means for carrying out any and all of the depicted functions.

Any combination of one or more computer readable medium(s) may be utilized with computing devices and systems as described herein. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples of the computer readable storage medium include, without limitation: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In embodiments of the present invention, a data store may be comprised of one or more of a database, file storage system, relational data storage system or any other data system or structure configured to store data. For example, the data store may be a relational database, working in conjunction with a relational database management system (RDBMS) for receiving, processing and storing data.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, systems as described herein can take the form of web-based computer software, which includes client/server software, software-as-a-service, peer-to-peer software, or the like.

EXEMPLARY EMBODIMENTS

Figure 9:
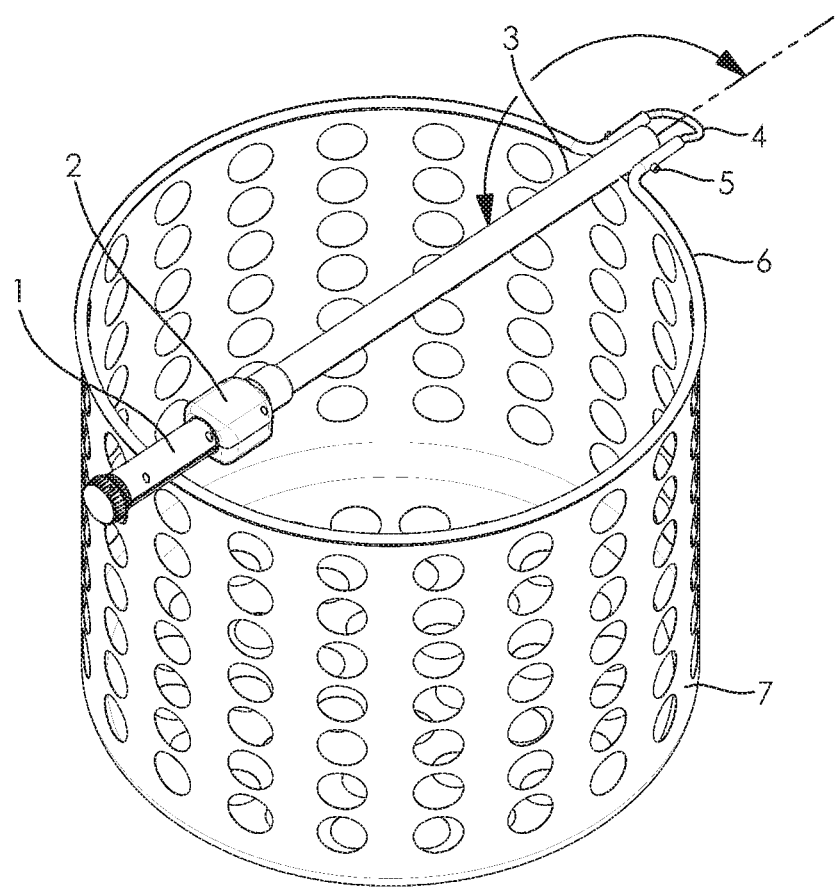
FIG. 9 illustrates a perspective view of a digital fishing net scale with its handle with its handle fully folded for storage or transport.

Turning to FIG. 1, according to an embodiment of the present invention, a perspective view of the digital fishing net scale with its handle 3 in extended position for use is shown. The handle 3 is connected to hoop 6 which serves to connect to and keep open mesh net 7. The circle around the digital scale 2 designates an area enlarged in FIG. 2;

In FIG. 2, according to an embodiment of the present invention, a perspective detail view of the digital scale 2 is shown. The figure illustrates the connection of the digital scale near the hand grip 1 at a distal end of the handle;

In FIG. 3, according to an embodiment of the present invention, an orthogonal top view of a digital fishing net scale with its handle 3 extended is shown. The circle around the digital scale 2 designates an area enlarged in FIG. 4;

In FIG. 4, according to an embodiment of the present invention, an orthogonal top view of a detail, the digital scale 2, is shown. The figure illustrates the connection of the digital scale 2 near the hand grip 1 at a distal end of the handle 3;

In FIG. 5, according to an embodiment of the present invention, an orthogonal side view of a digital fishing net scale with its handle 3 extended is shown. Hook 8 may be attached at the hoop end of the handle 3 for hanging the digital fishing net scale when folded up and not in use. The circle around the connection between hoop 6 and handle 3 designates an area enlarged in FIG. 6;

In FIG. 6, according to an embodiment of the present invention, an orthogonal side view of the connection of the hoop 6 to the handle 3 of the digital fishing net scale is shown. The figure illustrates the connecting pin 5 that reaches through a part of the loop 4 that extends from the hoop 6 and through the handle 3, with the handle 3 resting on and stabilized by the loop 4 that supports the handle 3 from below when extended;

In FIG. 7, according to an embodiment of the present invention, a perspective view of a digital fishing net scale with its handle 3 partially folded is shown. The figure illustrates the handle 3 resting on and stabilized by the loop 4 that extends from the hoop, and that supports the handle 3 from below when the handle 3 is extended, as indicated by the dashed line; and In FIG. 8, according to an embodiment of the present invention, a perspective detail view of the connection of the hoop 6 to the handle 3 of the fishing net is shown. The figure illustrates the connection by a connecting pin 5 that reaches through a part of the loop 5 that extends from the hoop 6 and through the handle 3;

In FIG. 9, according to an embodiment of the present invention, a perspective view of a digital fishing net scale with its handle 3 fully folded for storage or transport is shown.

In alternate embodiments, the digital fishing net scale may have additional or fewer components. One of ordinary skill in the art would appreciate that the digital fishing net scale may be operable with a number of optional components, and embodiments of the present invention are contemplated for use with any such optional component.

While multiple embodiments are disclosed, still other embodiments of the present invention will become apparent to those skilled in the art from this detailed description. There may be aspects of this invention that may be practiced without the implementation of some features as they are described. It should be understood that some details have not been described in detail in order to not unnecessarily obscure focus of the invention. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A digital fishing net scale for weighing a fish contained in the net, the scale comprising a hoop, a fishing net configured to contain a fish and connected to the hoop, a handle connected to the hoop and configured for holding the net during fishing and weighing, and a digital scale connected to the handle;
    wherein hoop, handle and their connection are configured with sufficient strength and rigidity for holding the net weighted by a fish;
    wherein the scale is a digital scale that is comprised in a housing connected to the handle;
    wherein the digital scale comprises computer executable code stored in non-volatile memory, a processor, a memory, a measuring component, a weighing module, a display, a storage component for data, and a communication component;
    wherein the digital scale components are operably connected and are configured to perform the following steps:
    measure the weight of a fish contained in the net over an amount of time;
    provide one or more number value in a unit corresponding to the one or more weight measurement, or to an average thereof;
    show the number value and its unit on the display;
    store the number value and its unit, optional catch related data, and optional hotspot related data, at least until it is uploaded; and
    upload the number value, optional related data, and optional hotspot related data via the communication component to an external data store.

2. The digital fishing net scale of claim 1, wherein the hoop and the handle are connected with a connecting pin configured to allow folding the handle by pivoting its distal end towards the hoop, and the connecting pin and its connection are configured with sufficient strength and rigidity for holding the net weighted by a fish.

3. The digital fishing net scale of claim 1, wherein the digital scale components are configured to perform the following further steps:
    determine one or more outlier in a plurality of number values;
    remove the one or more outlier;
    calculate an average value from the remaining number values; and
    show the average value on the display.

4. The digital fishing net scale of claim 1, wherein the digital fishing net scale further comprises one or more of a global positioning system (GPS), a time piece, a thermometer, a conductivity sensor, an image sensor or camera optionally operably connected to an object detection module, a microphone operably connected to a voice recognition module, a weather module; and
    wherein the digital scale components are configured to perform the following further steps:
    determine catch related data that is related to the number value determined for the weight of a fish;
    store the catch related data at least until it is uploaded; and
    upload the catch related data via the communication component to an external data store;
    wherein the catch related data comprises one or more of location, time, date, lunar phase, air temperature, water temperature, water salinity, species of fish, weather conditions and comments of a user.

5. The digital fishing net scale of claim 4, wherein the digital scale components further comprise a GPS, and the catch related data comprises the location.

6. The digital fishing net scale of claim 4, wherein the digital scale components further comprise a time piece, and the catch related data comprises one or more of the time, the date and the lunar phase.

7. The digital fishing net scale of claim 4, wherein the digital scale components further comprise an image sensor and an object detection module, and wherein the digital scale components are configured to determine whether a fish is present in the net before storing or uploading the number value.

8. The digital fishing net scale of claim 4, wherein the digital scale components further comprise a microphone and a voice recognition module, and the related data comprises the species of the weighed fish.

9. The digital fishing net scale of claim 4, wherein the digital scale components further comprise an image sensor and an object detection module, and the catch related data comprises the species of the weighed fish.

10. The digital fishing net scale of claim 1, wherein the digital scale components further comprise a display module configured to perform the following further steps:
    determine one or more of the time of day and weather conditions; and
    adjust one or more of brightness, contrast, gamma and color of the display.

11. The digital fishing net scale of claim 10, wherein the display module is configured to adjust the display by automatically selecting from a plurality of pre-configured settings for lighting conditions including one or more of bright day, overcast day, dawn, dusk, or night.

12. The digital fishing net scale of claim 10, wherein the display module is communicatively connected with one or more further digital scale component or module selected from time piece, weather module, camera, and image sensor.

13. A computer-implemented method for determining the weight of a fish caught in a digital fishing net scale,
    wherein the digital fishing net scale comprises a hoop, a fishing net configured to contain a fish and connected to the hoop, a handle connected to the hoop and configured for holding the net during fishing and weighing, and a digital scale connected to the handle;
    wherein hoop, handle and their connection are configured with sufficient strength and rigidity for holding the net weighted by a fish;
    wherein the scale is a digital scale that is comprised in a housing connected to the handle;
    wherein the digital fishing net scale comprises computer executable code stored in non-volatile memory, a processor, a memory, a measuring component, a weighing module, a display, a storage component for data, and a communication component, and wherein the digital scale components are operably connected and are configured to perform the steps of the method; and wherein the method comprises the steps of:

automatically measuring a number value corresponding to the weight of a fish contained in the net over an amount of time thus providing one or more weight measurement;

automatically providing one or more number value in a unit corresponding to the one or more weight measurement or to an average thereof;

automatically showing the number value and its unit on the display;

automatically storing the number value and its unit at least until it is uploaded; and automatically uploading the number value via the communication component to an external data store.

14. The method of claim 13, wherein the method steps further comprise the steps of:

automatically determining one or more outlier in a plurality of number values;

automatically removing the one or more outlier;

automatically calculating an average weight from the remaining number values; and automatically showing a number value corresponding to the calculated average weight on the display.

15. The method of claim 13, wherein the method steps further comprise the steps of:

automatically determining catch related data that is related to the numerical value determined for the weight of a fish;

automatically storing the catch related data at least until it is uploaded; and automatically uploading the catch related data via the communication component to an external data store;

wherein the catch related data comprises one or more of location, time, date, lunar phase, air temperature, water temperature, water salinity, species of fish, comments of a user, and weather conditions.

16. The method of claim 13, wherein the method steps further comprise the step of: determining, by one or more digital scale component and a display module operably connected to the one or more digital scale component, one or more of the time of day and weather conditions; and adjusting one or more of brightness, contrast, gamma and color of the display.

17. The method of claim 16, wherein adjusting one or more of brightness, contrast and color of the display is performed by automatically selecting from a plurality of pre-configured settings for lighting conditions including one or more of bright day, overcast day, dawn, dusk, or night.

18. A computer implemented method for providing fishing hotspot information based on a plurality of sources for hotspot related data, wherein the hotspot related data comprises weight and location, and optionally comprises one or more of time, date, lunar phase, air temperature, water temperature, water depth, fish activity, number of fish caught, water salinity, weather conditions, species of fish, and comments of a user;

wherein the data is determined at the time when the weight of a catch is determined by the digital scale;

wherein the method comprises the steps of:

receiving, at a remote computing system, weight data of a catch;

receiving, at said remote computing system, location data for the caught fish; and correlating, through the remote computing system, the data of a plurality of catches, to generate fishing hotspot information.

19. A system for providing fishing hotspot information based on a plurality of sources for hotspot related data;

wherein the hotspot related data sources comprise weight and location, and optionally comprises one or more of location, time, date, lunar phase, air temperature, water temperature, water depth, fish activity, number of fish caught, water salinity, weather conditions, species of fish, and comments of a user;

wherein the system comprises computer executable code stored in non-volatile memory, a processor, a memory, a display, a storage component for data, a digital fishing net scale, and a communication component;

wherein the system comprises one or more of a time piece, a thermometer, a sonar, a conductivity sensor, a weather module, an image sensor, a camera, a microphone, a data store data source, wherein the system components are operably connected and are configured to perform the following steps:

receiving, at a remote computing system, weight data and location data of a catch;

correlating, through the remote computing system, the data of a plurality of catches, to generate fishing hotspot information.

* * * * *